United States Patent
Kang et al.

(10) Patent No.: US 11,394,587 B2
(45) Date of Patent: Jul. 19, 2022

(54) MEASUREMENT AND REPORT FOR CROSS-LINK INTERFERENCE MANAGEMENT BASED ON REFERENCE SIGNALS

(71) Applicant: Telefonaktiebolaget LM Ericsson (publ), Stockholm (SE)

(72) Inventors: Du Ho Kang, Upplands Väsby (SE); Sebastian Faxér, Järfälla (SE); Robert Mark Harrison, Grapevine, TX (US); Sorour Falahati, Stockholm (SE); Havish Koorapaty, Saratoga, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 29 days.

(21) Appl. No.: 16/638,158

(22) PCT Filed: Aug. 10, 2018

(86) PCT No.: PCT/SE2018/050808
§ 371 (c)(1),
(2) Date: Feb. 11, 2020

(87) PCT Pub. No.: WO2019/032031
PCT Pub. Date: Feb. 14, 2019

(65) Prior Publication Data
US 2020/0169435 A1    May 28, 2020

Related U.S. Application Data

(60) Provisional application No. 62/544,408, filed on Aug. 11, 2017.

(51) Int. Cl.
*H04L 25/02* (2006.01)
*H04L 5/00* (2006.01)
(Continued)

(52) U.S. Cl.
CPC ........ *H04L 25/0226* (2013.01); *H04L 5/0051* (2013.01); *H04L 5/0073* (2013.01);
(Continued)

(58) Field of Classification Search
CPC . H04L 25/02; H04L 25/0224; H04L 25/0226; H04L 5/02; H04L 5/10;
(Continued)

(56) References Cited

U.S. PATENT DOCUMENTS

| 10,178,664 | B1 * | 1/2019 | Mansour | H04W 72/044 |
| 10,193,727 | B1 * | 1/2019 | Sung | H04L 5/0048 |

(Continued)

FOREIGN PATENT DOCUMENTS

| CN | WO2018228421 | * 12/2018 | H04B 17/345 |
| GB | 2494835 | * 9/2012 | H04L 1/18 |

(Continued)

OTHER PUBLICATIONS

CATT, "R1-1740039: Support of interference management schemes in duplexing flexibility," Third Generation Partnership Project (3GPP), TSG RAN WG1 NR Ad-Hoc#2, Jun. 27-30, 2017, 5 pages, Qingdao, P.R. China.

(Continued)

*Primary Examiner* — Warner Wong
(74) *Attorney, Agent, or Firm* — Withrow & Terranova, PLLC (57) ABSTRACT

Systems and methods for reducing cross-link interference in a wireless system are disclosed. In some embodiments, a method of operation of a wireless device in a wireless system comprises receiving, from a serving Access Point (AP), wireless device specific Sounding Reference Signal (SRS) or Demodulation Reference Signal (DMRS) configuration information for one or more potential aggressor wireless devices. The method further comprises performing (Continued)

one or more measurements on at least one of the one or more potential aggressor wireless devices using the wireless device specific SRS or DMRS configuration information for the at least one of the one or more potential aggressor wireless devices and reporting at least one of the one or more measurements to the serving AP. In this manner, cross-link interference measurement and reporting is enabled.

9 Claims, 7 Drawing Sheets

(51) Int. Cl.
  *H04L 5/10* (2006.01)
  *H04L 27/26* (2006.01)
  *H04W 24/10* (2009.01)
(52) U.S. Cl.
  CPC ............ *H04L 5/10* (2013.01); *H04L 27/2607* (2013.01); *H04W 24/10* (2013.01)
(58) Field of Classification Search
  CPC ... H04L 5/0051; H04L 5/0048; H04L 5/0058; H04L 27/2607; H04L 27/2605; H04L 5/003; H04L 5/0073; H04W 24/00; H04W 24/10
  See application file for complete search history.

(56) References Cited

U.S. PATENT DOCUMENTS

| | | | | |
|---|---|---|---|---|
| 2010/0216486 A1* | 8/2010 | Kwon | ............... | H04W 72/0426 455/452.2 |
| 2011/0081865 A1* | 4/2011 | Xiao | ................. | H04W 72/1205 455/63.1 |
| 2014/0269565 A1* | 9/2014 | Chou | .................... | H04L 5/0094 370/329 |
| 2015/0373694 A1* | 12/2015 | You | ....................... | H04L 5/0048 370/329 |
| 2017/0325177 A1* | 11/2017 | Liu | ..................... | H04W 52/367 |
| 2018/0279334 A1* | 9/2018 | Lim | .................... | H04L 27/2607 |
| 2018/0323887 A1* | 11/2018 | Azarian Yazdi | ...... | H04L 5/0073 |
| 2018/0323916 A1* | 11/2018 | Yang | ..................... | H04L 5/0053 |
| 2018/0367346 A1* | 12/2018 | Chen | .................... | H04B 17/345 |
| 2019/0273600 A1* | 9/2019 | Wang | .................... | H04W 68/00 |
| 2019/0363867 A1 | 11/2019 | Kang et al. | | |
| 2020/0037185 A1* | 1/2020 | Ghosh | .................. | H04B 17/345 |
| 2020/0106593 A1* | 4/2020 | Wu | ........................ | H04W 24/08 |

FOREIGN PATENT DOCUMENTS

| | | |
|---|---|---|
| WO | 2013025158 A1 | 2/2013 |
| WO | 2014107122 A1 | 7/2014 |
| WO | 2015043633 A1 | 4/2015 |
| WO | 2018120064 A1 | 7/2018 |
| WO | 2018128297 A1 | 7/2018 |
| WO | 2018147789 A1 | 8/2018 |
| WO | 2018231127 A1 | 12/2018 |

OTHER PUBLICATIONS

International Search Report and Written Opinion for International Patent Application No. PCT/SE2018/050808, dated Dec. 3, 2018, 15 pages.
International Preliminary Report on Patentability for International Patent Application No. PCT/SE2018/050808, dated Sep. 16, 2019, 4 pages.
Nokia, et al., "R1-17011313: Cross-link interference management based on Xn support," 3GPP TSG RAN WG1 NR Ad-Hoc #2, Jun. 27-30, 2017, Qingdao, China, 5 pages.
Samsung, "R1-1710754: Cross-link interference management based on UE measurements," 3GPP TSG RAN WG1 NR Ad-Hoc #2, Jun. 27-30, 2017, Qingdao, China, 4 pages.
ZTE, "R1-1707204: Discussion on Measurements and RS Design for CLI Mitigation," 3GPP TSG RAN WG1 Meeting #89, May 15-19, 2017, Hangzhou, China, 9 pages.
ZTE, "R1-1710128: UE-to-UE measurement as an enabler for CLI mitigation schemes," 3GPP TSG RAN WG1 Meeting NR Ad-Hoc #2, Jun. 27-30, 2017, Qingdao, China, 9 pages.
Extended European Search Report for European Patent Application No. 18843156.3, dated Mar. 16, 2021, 9 pages.
Mediatek Inc., "R1-1707839: Cross link interference measurements," 3GPP TSG RAN WG1 Meeting #89, May 15-19, 2017, Hangzhou, China, 7 pages.

* cited by examiner

MEASUREMENT AND REPORT FOR CROSS-LINK INTERFERENCE MANAGEMENT BASED ON REFERENCE SIGNALS

RELATED APPLICATIONS

This application is a 35 U.S.C. § 371 national phase filing of International Application No. PCT/SE2018/050808, filed Aug. 10, 2018, which claims the benefit of provisional patent application Ser. No. 62/544,408, filed Aug. 11, 2017, the disclosures of which are hereby incorporated herein by reference in their entireties.

BACKGROUND

New Radio (NR) design is based on a flexible structure where any time domain resource for transmission can be allocated for downlink or uplink or a combination of both. If the downlink and uplink transmissions occur on different carriers, it resembles the Frequency Division Duplexing (FDD) type of operation as in Long Term Evolution (LTE). However, if they occur on the same carrier it resembles the Time Division Duplexing (TDD) type of operation in LTE. Due to the built-in flexible design in NR, the NR operation is sometimes referred to as dynamic TDD operation. This enables NR to maximally utilize available radio resources in the most efficient way for both traffic directions. The traditional LTE technology only supports static TDD, where time domain resources are split between downlink and uplink based on a long term configuration, or flexible TDD operation where the changes in the downlink and uplink configuration can be made only over a period of 5 milliseconds (ms). In contrast, NR is based on the ability to flexibly choose the direction of transmission in periods of 1 ms or less.

Figure 1:
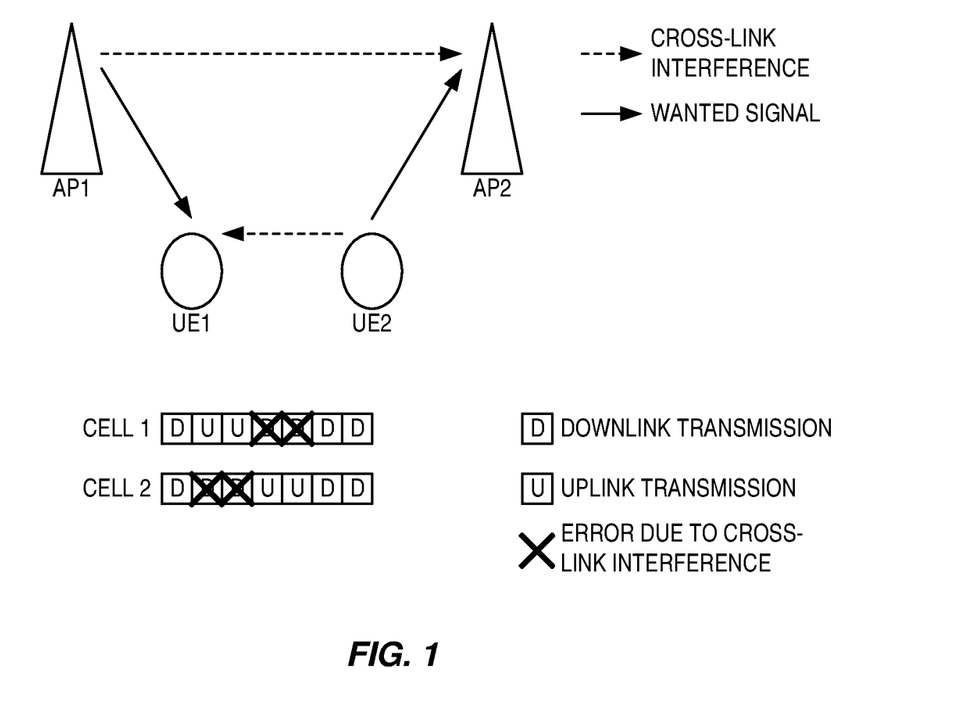
FIG. 1 illustrates the cross-link interference issue in a New Radio (NR) dynamic Time Division Duplexing (TDD) system.

The term "Access Point (AP)" is used herein to indicate a node that supports communications to one or more User Equipment devices (UEs). An AP is to be considered as generic terminology that represents any kind of node, e.g., a NR base station (gNB) in a Fifth Generation (5G) NR network as being specified in Third Generation Partnership Project (3GPP). Although dynamic TDD brings significant performance gain at low to medium loads, the performance benefits become smaller as the traffic load increases due to the cross-link interference. FIG. 1 illustrates the cross-link interference issue in a NR dynamic TDD system. As shown in FIG. 1, if two cells have different traffic directions, UE1 in downlink experiences very strong interference from UE2 which can be closer than the serving AP1. From AP2 in uplink perspective, AP2 will also experience interference from AP1 since AP1 is transmitting. This cross-link interference at high load is the key impediment to performance gains from dynamic TDD operation at higher loads as compared to static TDD. Most solutions to minimize the cross-link interference involve defining signaling between APs in order to exchange information regarding the sources and the levels of interference. However, real-time signaling usually requires overhead and complexity in equipment. Therefore, a more intelligent solution for cross-link interference management without inter-cell signaling is required.

Figure 2:
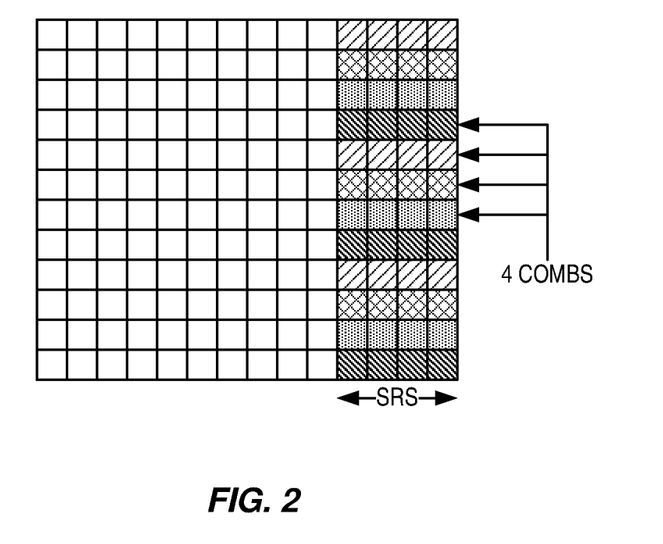
FIG. 2 illustrates an example of Frequency Domain Multiplexing (FDM) multiplexing of multiple Sounding Reference Signal (SRS) transmissions from different User Equipment devices (UEs) (Comb-4 case)

In NR, there is a Sounding Reference Signal (SRS) transmitted from the UE. The main purpose of it is for estimating channel status in all or part of carrier bandwidth in a different time granularity. In a TDD system, this SRS can be also used for reciprocity based channel estimation for downlink transmission. In NR, SRS can be UE specifically configured by allocating a different time (e.g., slot, symbol), frequency (sub-band or comb number), reference signal sequence, or cyclic shift, as shown in FIG. 2. In particular, FIG. 2 illustrates an example of frequency division multiplexing of multiple SRS transmissions from different UEs for the four combs case (i.e., for Comb-4).

In NR, data transmissions by the UE carried by the Physical Uplink Shared Channel (PUSCH) also contain a Demodulation Reference Signal (DMRS) that is used by the gNB to perform channel estimation in order to demodulate and decode the data. Unlike the SRS, the DMRSs are not transmitted without the transmission of any associated data transmissions.

SUMMARY

Systems and methods for reducing cross-link interference in a wireless system are disclosed. In some embodiments, a method of operation of a wireless device in a wireless system comprises receiving, from a serving Access Point (AP), wireless device specific Sounding Reference Signal (SRS) or Demodulation Reference Signal (DMRS) configuration information for one or more potential aggressor wireless devices. The method further comprises performing one or more measurements on at least one of the one or more potential aggressor wireless devices using the wireless device specific SRS or DMRS configuration information for the at least one of the one or more potential aggressor wireless devices and reporting at least one of the one or more measurements to the serving AP. In this manner, cross-link interference measurement and reporting is enabled.

In some embodiments, the wireless device is served by the serving AP on a serving cell of the wireless device and the one or more potential aggressor wireless devices are served by at least one other cell, the at least one other cell being different than the serving cell of the wireless device.

In some embodiments, the method further comprises receiving, from the serving AP, a request for periodic measurement reporting of SRS or DMRS transmitted by one or more aggressor wireless devices served by one or more other APs. In some embodiments, reporting the at least one of the one or more measurements to the serving AP comprises reporting the at least one of the one or more measurements to the serving AP in accordance with the request. In some embodiments, the request is specific for the wireless device. In some other embodiments, the request is a broadcast request. In some embodiments, the request specifies a report period.

In some embodiments, the method further comprises receiving, from the serving AP, one or more triggering conditions for aperiodic measurement reporting of SRS or DMRS transmitted by one or more aggressor wireless devices served by one or more other APs. In some embodiments, the one or more triggering conditions comprise: a triggering condition that Reference Signal Received Power (RSRP) from the serving cell of the wireless device is below a certain threshold; a triggering condition that an aggregate cross-link interference exceeds a certain threshold; a triggering condition that a ratio of the aggregate cross-link interference and overall aggregate interference exceeds a threshold; and/or a triggering condition that is based on an estimated value of a parameter that is related to a burstiness of the RSRP from the serving cell, the aggregate cross-link interference, and/or the ratio of the aggregate cross-link interference and the overall aggregate interference. In some embodiments, reporting the at least one of the one or more measurements to the serving AP comprises reporting the at least one of the one or more measurements to the serving AP upon occurrence of at least one of the one or more triggering conditions.

In some embodiments, reporting the at least one of the one or more measurements to the serving AP comprises reporting the at least one of the one or more measurements and corresponding aggressor wireless device information. In some embodiments, the corresponding aggressor wireless device information comprises corresponding SRS or DMRS configuration information and/or corresponding resource allocation information.

In some embodiments, the one or more measurements comprise one or more RSRP measurements or parts of one or more RSRP measurements.

In some embodiments, the at least one of the one or more measurements reported to the AP comprise: a measurement for a potential aggressor wireless device for which a contribution of the potential aggressor wireless device to an overall cross-link interference is above a certain threshold; a measurement for a potential aggressor wireless device for which a difference between the contribution of the potential aggressor wireless device to the overall cross-link interference and the overall cross-link interference is above a certain threshold; a measurement for a potential aggressor wireless device for which a difference between the contribution of the potential aggressor wireless device to the overall cross-link interference and an overall interference is above a certain threshold; and/or a measurement for a potential aggressor wireless device for which a difference between the contribution of the potential aggressor wireless device to the overall cross-link interference and a wanted signal strength is above a certain threshold.

In some embodiments, the wireless device specific SRS or DMRS configuration information comprises wireless device specific time-frequency resource allocation and cell or wireless device specific SRS configuration information.

In some embodiments, the wireless device specific SRS or DMRS configuration information comprises information that indicates Orthogonal Frequency Division Multiplexing (OFDM) symbols used for SRS transmission, Reference Signal (RS) sequences used, frequency hopping configuration, sub-band index, comb configuration or number, power setting, number of cyclic shifts, time periods where SRS transmissions should be measured, and/or a periodicity of measurement opportunities.

In some embodiments, the method further comprises receiving, from the serving AP, information that indicates one or more measurement occasions for performing measurements on the one or more potential aggressor wireless devices.

In some embodiments, performing the one or more measurements on the at least one of the one or more potential aggressor wireless devices comprises blindly attempting to detect a DMRS from a set of DMRSs for the one or more potential aggressor wireless device.

Embodiments of a wireless device for a wireless system are also disclosed. In some embodiments, a wireless device for a wireless system is adapted to receive, from a serving AP, wireless device specific SRS or DMRS configuration information for one or more potential aggressor wireless devices, perform one or more measurements on at least one of the one or more potential aggressor wireless devices using the wireless device specific SRS or DMRS configuration information for the at least one of the one or more potential aggressor wireless devices, and report at least one of the one or more measurements to the serving AP.

In some embodiments, a wireless device for a wireless system comprises one or more transceivers and circuitry associated with the one or more transceivers whereby the wireless device is operable to receive, from a serving AP, wireless device specific SRS or DMRS configuration information for one or more potential aggressor wireless devices, perform one or more measurements on at least one of the one or more potential aggressor wireless devices using the wireless device specific SRS or DMRS configuration information for the at least one of the one or more potential aggressor wireless devices, and report at least one of the one or more measurements to the serving AP.

Embodiments of a method of operation of an AP in a wireless system are also disclosed. In some embodiments, a method of operation of an AP in a wireless system comprises sending, to a wireless device, wireless device specific SRS or DMRS configuration information for one or more potential aggressor wireless devices and receiving, from the wireless device, a measurement report comprising at least one measurement of at least one of the one or more potential aggressor wireless devices.

In some embodiments, the wireless device is served by the AP on a serving cell of the wireless device and the one or more potential aggressor wireless devices are served by at least one other cell, the at least one other cell being different than the serving cell of the wireless device.

In some embodiments, the method further comprises sending, to the wireless device, a request for periodic measurement reporting of SRS or DMRS transmitted by one or more aggressor wireless devices served by one or more other APs.

In some embodiments, the method further comprises sending, to the wireless device, one or more triggering conditions for aperiodic measurement reporting of SRS or DMRS transmitted by one or more aggressor wireless devices served by one or more other APs.

In some embodiments, the wireless device specific SRS or DMRS configuration information comprises wireless device specific time-frequency resource allocation and cell or wireless device specific SRS configuration information.

In some embodiments, the wireless device specific SRS or DMRS configuration information comprises information that indicates OFDM symbols used for SRS transmission, RS sequences used, frequency hopping configuration, sub-band index, comb configuration or number, power setting, number of cyclic shifts, time periods (e.g., slots) where SRS transmissions should be measured, and/or a periodicity of the measurement opportunities.

In some embodiments, the method further comprises receiving, from one or more other APs, the wireless device specific SRS or DMRS configuration information for the one or more potential aggressor wireless devices.

Embodiments of an AP for a wireless system are also disclosed. In some embodiments, an AP for a wireless system is adapted to send, to a wireless device, wireless device specific SRS or DMRS configuration information for one or more potential aggressor wireless devices and receive, from the wireless device, a measurement report comprising at least one measurement of at least one of the one or more potential aggressor wireless devices.

In some embodiments, an AP for a wireless system comprises at least one processor and memory comprising instructions executable by the at least one processor whereby the AP is operable to send, to a wireless device, wireless device specific SRS or DMRS configuration information for one or more potential aggressor wireless devices and receive, from the wireless device, a measurement report comprising at least one measurement of at least one of the one or more potential aggressor wireless devices.

In some embodiments, a method of operation of an AP in a wireless system comprises signaling, to one or more other APs, to indicate wireless device specific transmission parameters which correspond to identified aggressor wireless devices based on SRS or DMRS measurement reports received from a victim wireless device.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node or Access Point (AP): As used herein, a "radio access node" or "radio network node" or "AP" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

The present disclosure proposes signaling and methods for measurement reports based on reference signals, e.g., Reference Signal Received Power (RSRP) measurement and report from the UE to a serving gNB for the purpose of cross-link interference management.

The following advantages have been identified. The solutions enable UE to UE cross-link interference measurement and reporting. The solutions enable an individual gNB to monitor UE to UE cross-link interference situations to trigger proper cross-link interference management. The solutions reduce measurement complexity. The solutions are used to mitigate UE to UE cross-link interference and to improve system performance.

In the following, embodiments of the present disclosure are described using RSRP as an example of a measurement that is made based on a known Reference Signal (RS), e.g., the Sounding Reference Signal (SRS) or the Demodulation Reference Signal (DMRS). However, it should be apparent to those skilled in the art that the teachings of the present disclosure are applicable to other such measurements as well. Furthermore, we describe different signaling and methods to estimate RSRP from one UE based on SRS or DMRS and reporting the results to a serving gNB.

Figure 3:
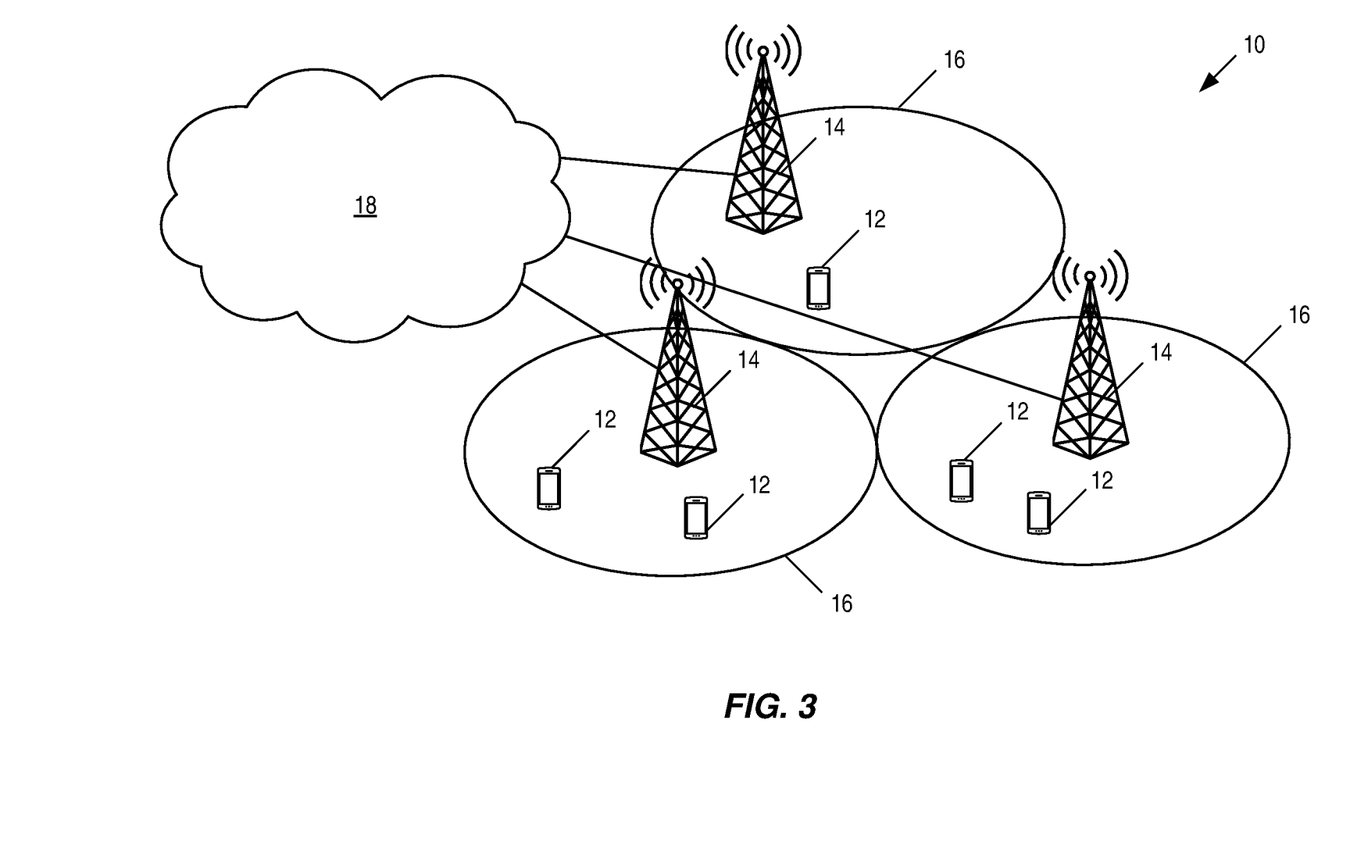
FIG. 3 illustrates one example of a wireless system in which embodiments of the present disclosure may be implemented.

FIG. 3 illustrates one example of a wireless communication system 10 in which embodiments of the present disclosure may be implemented. In this example, the wireless communication system 10 is a cellular communications network and, in particular, is a 3GPP NR cellular communications network. As illustrated, the wireless communication system 10 includes a number of wireless devices 12 (i.e., wireless communication devices 12 or UEs 12). In addition, the wireless communication system 10 includes a Radio Access Network (RAN) that includes a number of radio access nodes 14 (e.g., gNBs) (also referred to herein as APs 14) serving corresponding coverage areas or cells 16. The radio access nodes 14 are connected to a core network 18, which includes a number of core network nodes (not shown), as will be appreciated by one of skill in the art.

Figure 4:
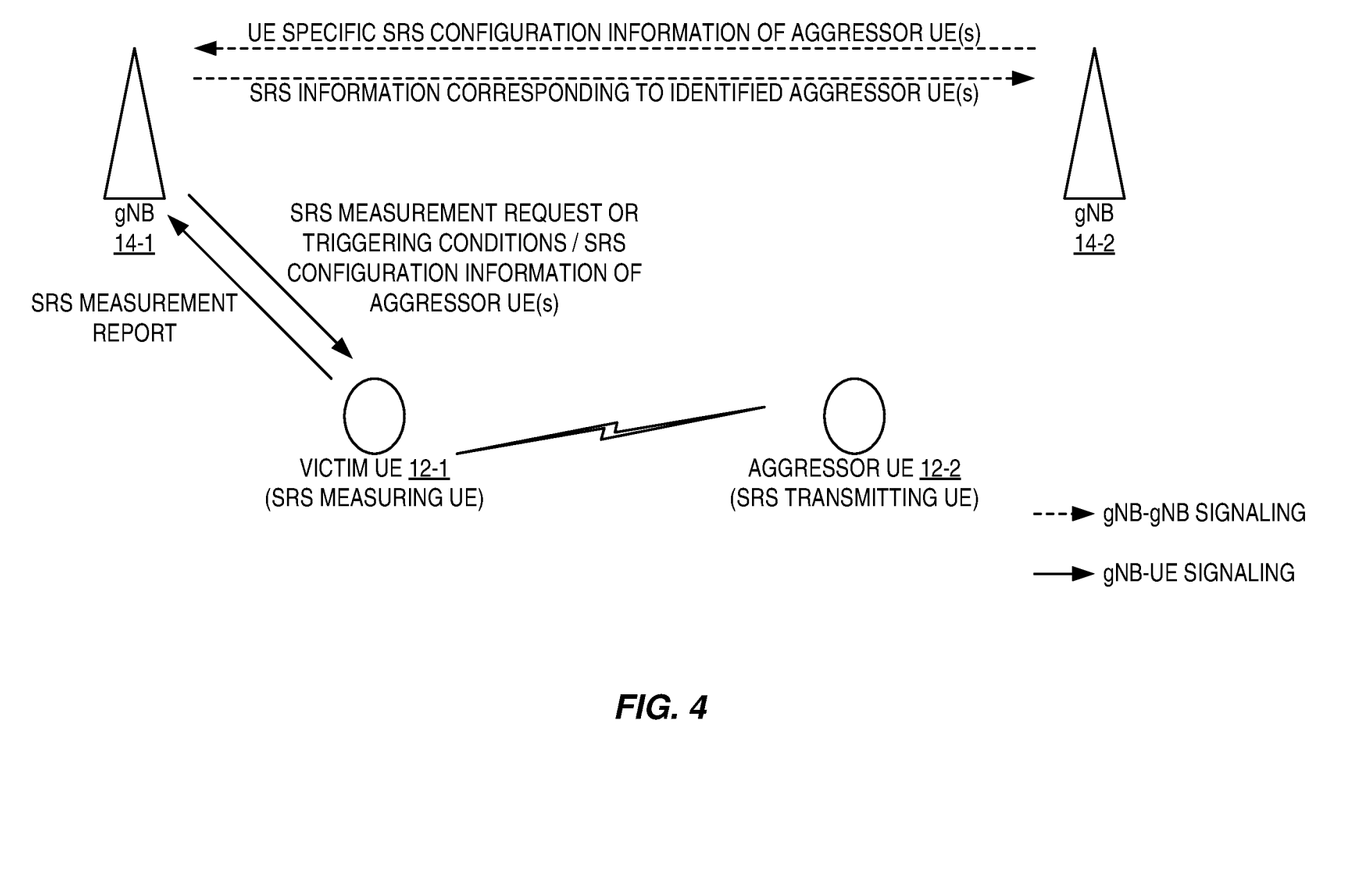
FIG. 4 illustrates signaling for SRS based UE to UE interference measurement and report in a NR dynamic TDD system (a SRS based example) according to some embodiments of the present disclosure.

New signaling is disclosed to support SRS and/or DMRS based RSRP measurement from one UE 12 in a neighboring cell and to support the reporting of measurement results. In this regard, FIG. 4 illustrates an example of signaling for SRS based UE to UE interference measurement and reporting in a NR dynamic Time Division Duplexing (TDD)

system. As shown in FIG. 4, a victim UE 12-1 (i.e., the SRS measuring UE) measures one or multiple SRS transmissions corresponding to one or multiple aggressor UEs 12-2 (i.e., SRS transmitting UEs) in order to estimate RSRP for each aggressor UE 12-2. Note that for the example of FIG. 4 and the following discussion, the radio access nodes 14 (i.e., the APs) are gNBs 14, i.e., a first gNB 14-1 serving the victim UE 12-1 and a second gNB 14-2 serving the aggressor UE 12-2. However, it should be understood that this discussion relates more generally to any type of radio access node. Further, while FIG. 4 illustrates an example that uses SRS, DMRS may additionally or alternatively be used.

For this, the following signaling is introduced:

Signaling from a serving gNB 14-1 to its UE 12-1 to request periodic measurement reports of SRS or DMRS transmitted by aggressor UEs 12-2 in other gNBs 14-2 (i.e., served by other gNBs 14-2);

Signaling from a serving gNB 14-1 to its UE 12-1 to provide measurement triggering condition related information for an aperiodic measurement report of SRS or DMRS transmitted by potential aggressor UEs 12-2 in other cells;

Signaling from a serving gNB 14-1 to its UE 12-1 to provide UE specific SRS or DMRS configuration related information of potential aggressor UEs 12-2 in other cells;

Signaling from a served UE 12-1 to a serving gNB 14-1 to report SRS or DMRS measurement results related information for interfering UEs 12-2;

Signaling between gNBs 14-1 and 14-2 to exchange UE specific SRS or DMRS configurations; and/or Signaling between gNBs 14-1 and 14-2 to indicate UE specific transmission parameters which correspond to identified aggressor UEs 12-2 based on SRS or DMRS measurement reports. This can be via unspecified signaling means or over standard interfaces such as the Xn interface.

It should be noted that the inter-gNB signaling and inter-UE/gNB signaling are not necessarily dependent.

The signaling to the UE 12-1 may be delivered via higher layer signaling, physical layer signaling, or a combination thereof. The measurement configuration for SRS can allow for configuration of periodic measurements by the UE 12-1, whereas the measurement configuration for DMRS is not periodic since the occurrence of the DMRS is dependent on data scheduling and, in general, less predictable. Therefore, in one non-limiting example of the use of the DMRS in the present disclosure, measurements on the DMRS are made opportunistically by the UE 12-1 by blindly attempting to detect a DMRS from the set of DMRSs.

The details of a SRS or DMRS measurement report request for a periodic report and triggering conditions that a gNB 14-1 uses to send the request are now described. The request can be UE specific or broadcast to enable reports from all associated UEs 12 in a serving gNB 14-1. The signal can be sent via higher layer (Radio Resource Control (RRC)) signaling, physical layer signaling (Downlink Control Information (DCI) messages), or via a combination of higher layer and physical layer (DCI messages) signaling. In the latter option, the higher layer signaling may provide a small set of triggering conditions from which the DCI signaling can dynamically trigger a measurement report.

The request also specifies a report period. As a non-limiting example, there are several triggering conditions at a gNB side to send the UE specific measurement request signal (i.e., used by the gNB 14-1 to trigger the sending of the UE specific measurement request), which include any one or more of the following:

The estimated value of a parameter related to the received interference, e.g., downlink Signal to Interference plus Noise Ratio (SINR), is below a threshold (e.g., a predefined threshold). This parameter can be derived from the feedback provided by the UE 12-1 for link adaptation purposes.

The number of downlink retransmissions in a certain period of time exceeds a threshold (e.g., a predefined threshold).

The number of consecutive retransmissions exceeds a threshold (e.g., a predefined threshold).

The buffer size of the UE 12-1 for downlink exceeds a threshold (e.g., a predefined threshold).

The estimated value of a parameter that is related to the burstiness of any of the above measures, e.g., the variance or the number of measurements that exceed the average by more than a certain amount, exceeds a threshold (e.g., a predefined threshold). Examples include:

The difference between the maximum and minimum measurements of any of above mentioned values during a certain period of time is larger than a certain threshold (e.g., a predefined threshold); and The difference between the maximum and average of measurements of any of the above values during a certain period of time is larger than a certain threshold (e.g., a predefined threshold).

The number of UEs 12 fulfilling any one or more of the above conditions exceeds a threshold (e.g., a predefined threshold).

If the number of UEs 12 that meets any one of above conditions exceeds a threshold (e.g., a predefined threshold), the request signal can be broadcast to all associated UEs 12.

Triggering conditions for an aperiodic, event triggered SRS or DMRS measurement report will now be described. In some embodiments, the report condition is predefined with a table and the index corresponding to each condition defined in a table can be signaled to UEs 12. The signaled conditions can include any one or more of the following:

RSRP or Reference Signal Received Quality (RSRQ) from a serving cell is below a certain threshold (e.g., a predefined threshold).

Aggregate cross-link interference exceeds a certain threshold. The aggregate cross-link interference can be obtained by measuring all indicated SRS resource elements of aggressor UEs 12-2.

Ratio of aggregate cross-link interference and overall aggregate interference exceeds a threshold (e.g., a predefined threshold).

The estimated value of a parameter that is related to the burstiness of any of the above measures, e.g., the variance or the number of measurements that exceed the average by more than a certain amount, exceeds a threshold (e.g., a predefined threshold). Examples include:

The difference between the maximum and minimum measurements of any of above mentioned values during a certain period of time is larger than a certain threshold (e.g., a predefined threshold); and The difference between the maximum and average of measurements of any of the above values during a certain period of time is larger than a certain threshold (e.g., a predefined threshold).

The information of SRS or DMRS configuration which is signaled to victim UEs (e.g., the UE 12-1, which is also referred to as a measuring UE) and used by the victim UEs to perform measurement on aggressor UEs will now be described. Both UE specific time-frequency resource allocation and cell- (or UE-) specific SRS configuration information are signaled. As non-limiting examples, the information can include any one or combinations of the number of Orthogonal Frequency Division Multiplexing (OFDM) symbols used for SRS transmission, RS sequences, frequency hopping configuration, sub-band index, comb configuration/number, power setting, and number of cyclic shifts the slots where SRS transmissions should be measured as well as the periodicity of the measurement opportunities. The configuration for the DMRS may use a smaller set of parameters than the SRS.

The signaling can be sent via higher layer (RRC) signaling, physical layer signaling (DCI messages), or via a combination of higher layer and physical layer (DCI messages) signaling. In the latter option, the higher layer signaling may provide a small set of parameter choices from which the DCI signaling can dynamically indicate a particular configuration. In this option, the measurement report from the UE 12-1 may also use the smaller parameter set used for dynamic signaling to minimize the overhead of transmitting the report to the gNB 14-1. For instance, the UE 12-1 may use a small set of indices to indicate the detected SRS sequence. The gNB 14-1 (or alternatively the gNB 14-2) then determines the particular UE 12-2 generating cross-link interference for which the measurement was made by combining this report with the known configuration conveyed to the UE via RRC signaling.

As part of the measurement configuration, the gNB 14-1 may indicate to the UE 12-1 any of the following options:
- A single measurement occasion at a particular time and frequency resource for which a measurement report must be returned.
- A set of measurement occasions occurring at specific times and in particular frequency resources. The measurement occasions may or may not be periodic in time. The reporting may be periodic or aperiodic based on some triggering conditions.
- Unspecified measurement occasions with the UE 12-1 attempting to detect interfering UEs 12-2 on its own. In one non-limiting example, the UE 12-1 may perform such measurements only when some of the interference conditions based on a simpler signal strength measure exceed a certain threshold (e.g., a predefined threshold). The reporting may be periodic or aperiodic based on some triggering conditions.

The details of the reported information will now be described. The victim UE 12-1 will report either RSRP or corresponding index which the predetermined interference range belongs to. Since at least in some scenarios the victim UE 12-1 will report multiple RSRPs for multiple aggressor UEs 12-2, the reported RSRP information will also include corresponding aggressor UE information. The corresponding aggressor UE information can be SRS or DMRS configuration or resource allocation information such as cyclic shift or RS sequence, sub-band index. In addition, only part of measured RSRP can be reported. One example is that the first N largest RSRPs and corresponding UE SRS configuration information are reported. Another non-limiting example is selecting the aggressor UE 12-2 for report such that:
- its contribution to overall cross-link interference is above a certain threshold (e.g., a predefined threshold);
- the difference between its cross-link interference contribution and overall cross-link interference is above a certain threshold (e.g., a predefined threshold);
- the difference between its cross-link interference contribution and overall interference is above a certain threshold (e.g., a predefined threshold); and
- the difference between its cross-link interference contribution and wanted signal strength is above a certain threshold (e.g., a predefined threshold).

Figure 5:
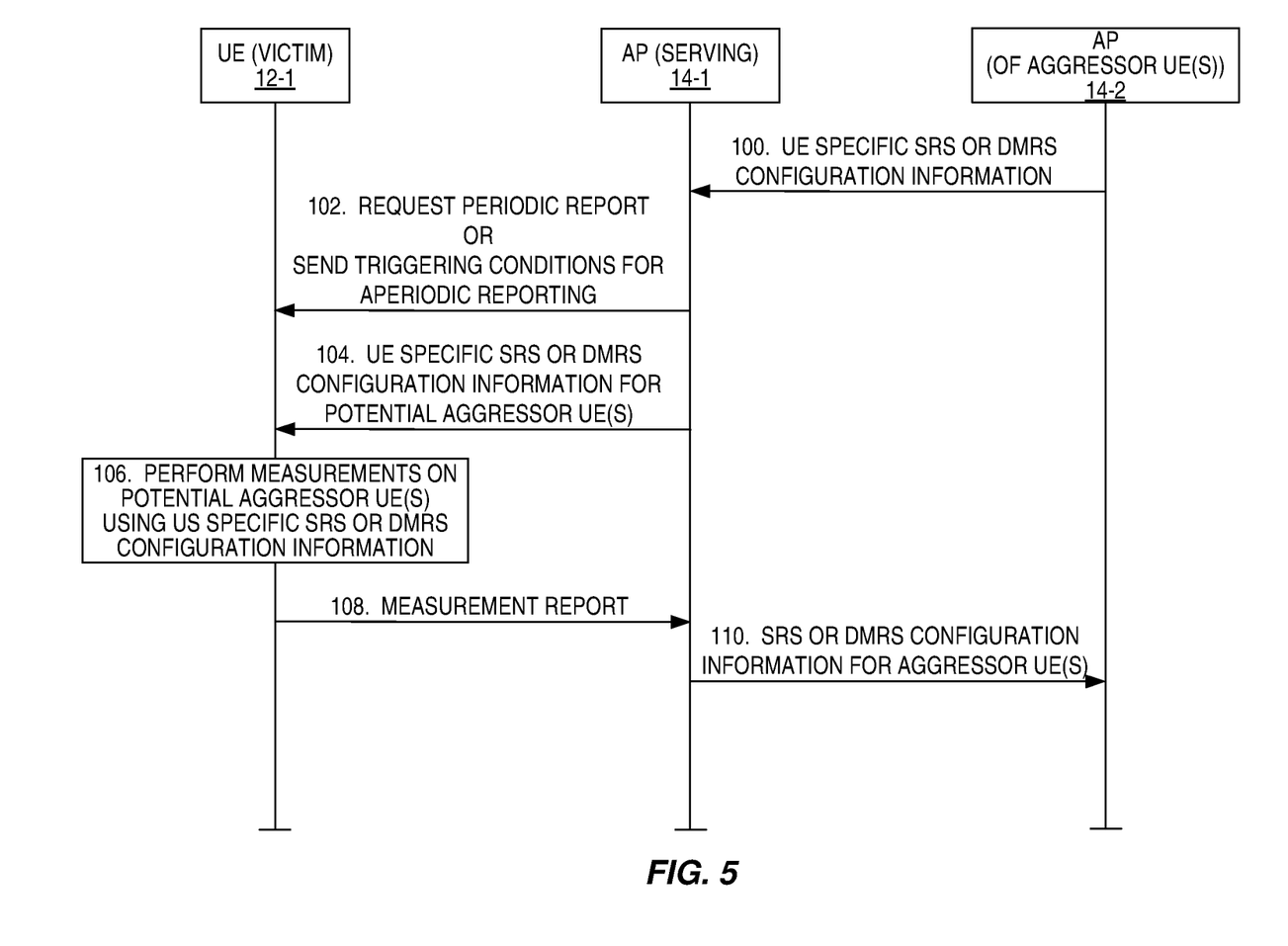
FIG. 5 illustrates the operation of the system of FIG. 3 in accordance with at least some embodiments of the present disclosure.

FIG. 5 illustrates the operation of the victim UE 12-1, the AP 14-1 serving the victim UE 12-1, and the AP 14-2 serving the one or more aggressor UEs 12-2 according to at least some of the embodiments disclosed herein. As illustrated, the AP 14-1 receives or otherwise obtains UE specific SRS or DMRS configuration information from the AP 14-2 for one or more potential aggressor UEs, as described above (step 100). Depending on the particular embodiment or scenario, the serving AP 14-1 sends a request to the victim UE 12-1 for a periodic measurement report or sends triggering conditions for aperiodic reporting, as described above (step 102). The serving AP 14-1 also sends the UE specific SRS or DMRS configuration information obtained for the one or more potential aggressor UEs to the victim UE 12-1, as described above (step 104). The victim UE 12-1 then performs measurements on at least one of the one or more potential aggressor UEs using the UE specific SRS or DMRS configuration information for the potential aggressor UE(s) and in accordance with either the request for periodic reporting or the triggering conditions for aperiodic reporting, as described above (step 106). The victim UE 12-1 sends a measurement report to the serving AP 14-1, as described above (step 108). The measurement report may include a measurement(s) for only one aggressor UE 12-2 or multiple aggressor UEs 12-2, depending on the particular embodiment and scenario. At least in some embodiments, the serving AP 14-1 sends the SRS or DMRS configuration information for the identified aggressor UE(s) 12-2 to the AP 14-2, as described above (step 110).

In summary, the present disclosure teaches signaling and methods for measurements based on reference signals such as the SRS and DMRS and reporting of these measurements in order to manage UE to UE interference in a dynamic TDD system. As discussed above, some of the aspects discussed herein are introducing new signaling for measurement request or measurement triggering conditions and also considering NR SRS or DMRS specific information.

Figure 6:
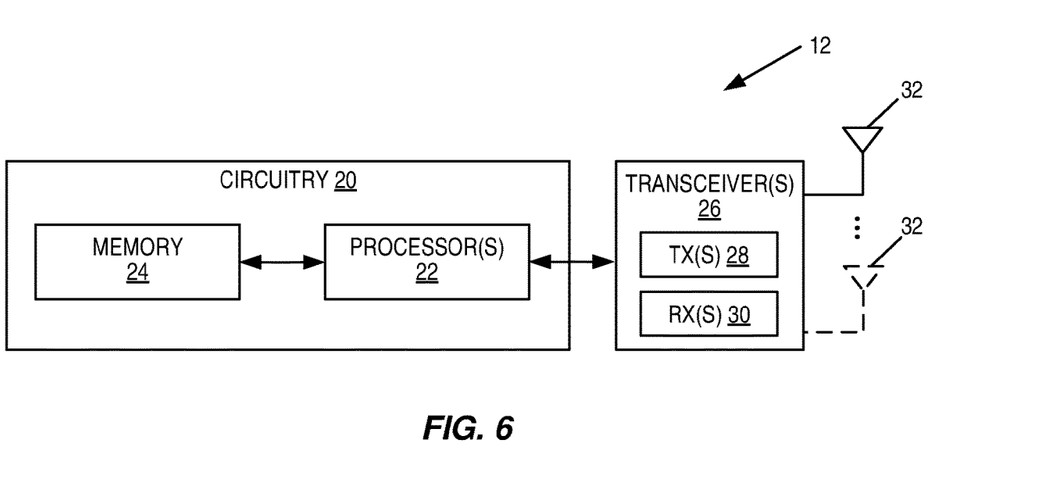
FIGS. 6 and 7 illustrate example embodiments of a wireless device.

FIG. 6 is a schematic block diagram of the wireless device 12, or UE 12, according to some embodiments of the present disclosure. As illustrated, the wireless device 12 includes circuitry 20 comprising one or more processors 22 (e.g., Central Processing Units (CPUs), Application Specific Integrated Circuits (ASICs), Field Programmable Gate Arrays (FPGAs), Digital Signal Processors (DSPs), and/or the like) and memory 24. The wireless device 12 also includes one or more transceivers 26 each including one or more transmitters 28 and one or more receivers 30 coupled to one or more antennas 32. In some embodiments, the functionality of the wireless device 12 described herein may be implemented in hardware (e.g., via hardware within the circuitry 20 and/or within the processor(s) 22) or be implemented in a combination of hardware and software (e.g., fully or partially implemented in software that is, e.g., stored in the memory 24 and executed by the processor(s) 22).

In some embodiments, a computer program including instructions which, when executed by the at least one processor 22, causes the at least one processor 22 to carry out at least some of the functionality of the wireless device 12 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 7:
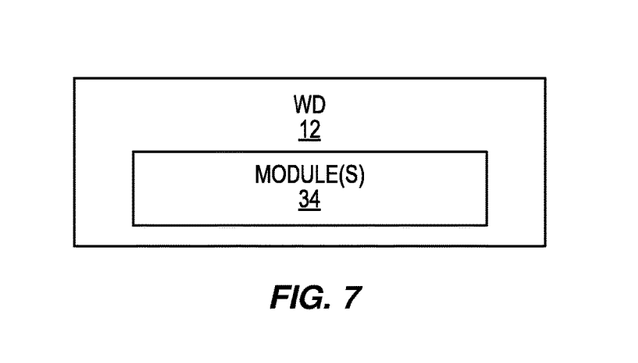

FIG. 7 is a schematic block diagram of the wireless device 12, or UE, according to some other embodiments of the present disclosure. The wireless device 12 includes one or more modules 34, each of which is implemented in software. The module(s) 34 provide the functionality of the wireless device 12 described herein (e.g., as described with respect to FIGS. 4 and 5).

Figure 8:
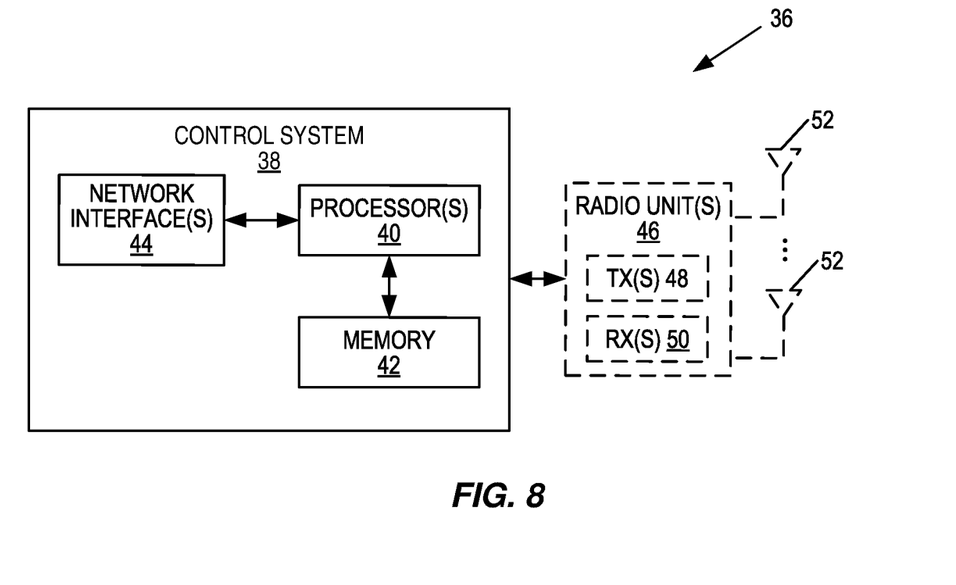
FIGS. 8 through 10 illustrate example embodiments of a network node.

FIG. 8 is a schematic block diagram of a network node 36 (e.g., a radio access node 14 such as, for example, an eNB or gNB or a core network node) according to some embodiments of the present disclosure. As illustrated, the network node 36 includes a control system 38 that includes circuitry comprising one or more processors 40 (e.g., CPUs, ASICs, DSPs, FPGAs, and/or the like) and memory 42. The control system 38 also includes a network interface 44. In embodiments in which the network node 36 is a radio access node 14, the network node 36 also includes one or more radio units 46 that each include one or more transmitters 48 and one or more receivers 50 coupled to one or more antennas 52. In some embodiments, the functionality of the network node 36 described above may be fully or partially implemented in software that is, e.g., stored in the memory 42 and executed by the processor(s) 40.

Figure 9:
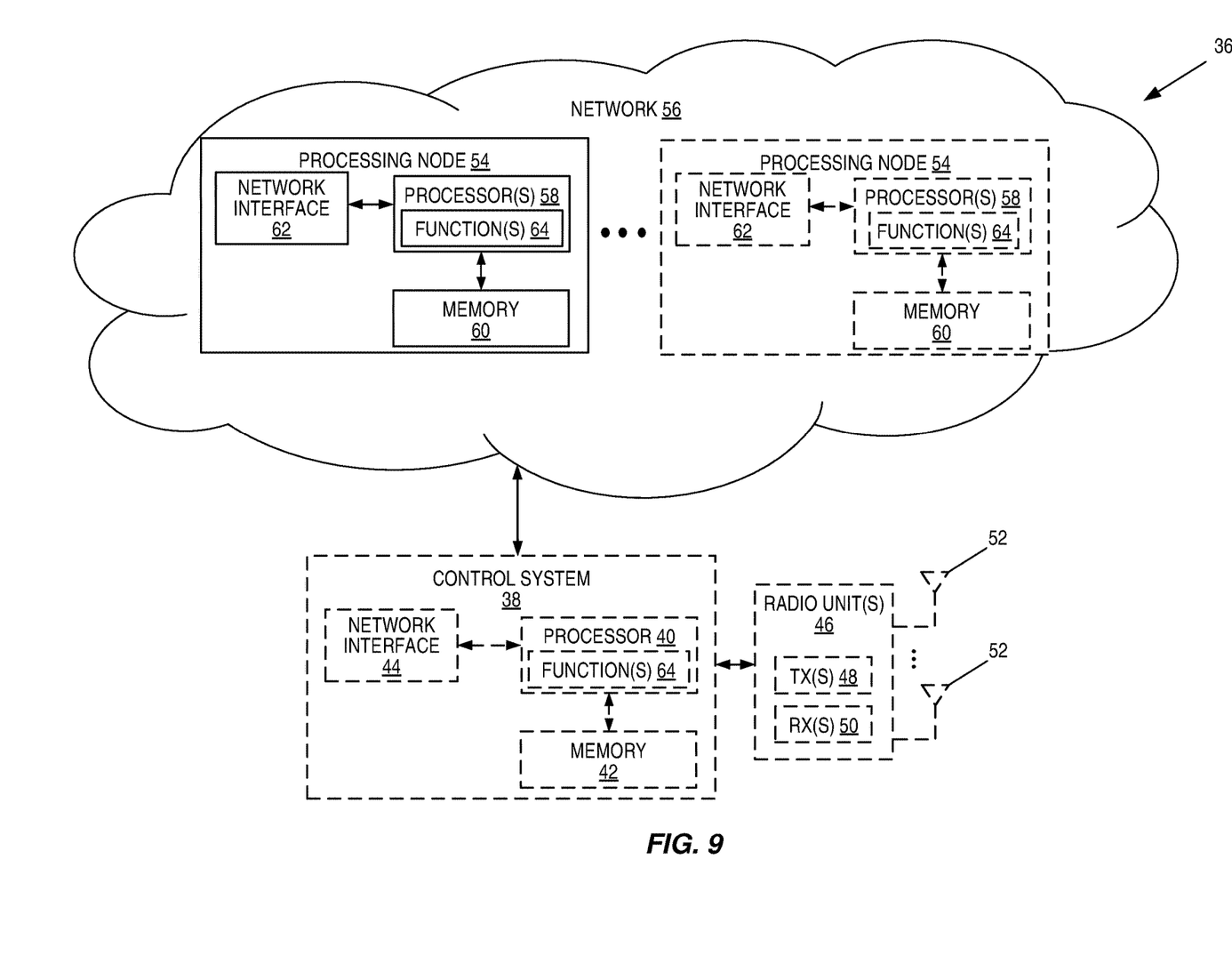

FIG. 9 is a schematic block diagram that illustrates a virtualized embodiment of the network node 36 (e.g., the radio access node 14 or a core network node) according to some embodiments of the present disclosure. As used herein, a "virtualized" network node 36 is a network node 36 in which at least a portion of the functionality of the network node 36 is implemented as a virtual component (e.g., via a virtual machine(s) executing on a physical processing node (s) in a network(s)). As illustrated, the network node 36 optionally includes the control system 38, as described with respect to FIG. 8. In addition, if the network node 36 is the radio access node 14, the network node 36 also includes the one or more radio units 46, as described with respect to FIG. 8. The control system 38 (if present) is connected to one or more processing nodes 54 coupled to or included as part of a network(s) 56 via the network interface 44. Alternatively, if the control system 38 is not present, the one or more radio units 46 (if present) are connected to the one or more processing nodes 54 via a network interface(s). Alternatively, all of the functionality of the network node 36 described herein may be implemented in the processing nodes 54. Each processing node 54 includes one or more processors 58 (e.g., CPUs, ASICs, DSPs, FPGAs, and/or the like), memory 60, and a network interface 62.

In this example, functions 64 of the network node 36 (e.g., the functions of the network nodes described above with respect to, e.g., FIGS. 4 and 5) described herein are implemented at the one or more processing nodes 54 or distributed across the control system 38 (if present) and the one or more processing nodes 54 in any desired manner. In some particular embodiments, some or all of the functions 64 of the network node 36 described herein are implemented as virtual components executed by one or more virtual machines implemented in a virtual environment(s) hosted by the processing node(s) 54. As will be appreciated by one of ordinary skill in the art, additional signaling or communication between the processing node(s) 54 and the control system 38 (if present) or alternatively the radio unit(s) 46 (if present) is used in order to carry out at least some of the desired functions. Notably, in some embodiments, the control system 38 may not be included, in which case the radio unit(s) 46 (if present) communicates directly with the processing node(s) 54 via an appropriate network interface(s).

In some particular embodiments, higher layer functionality (e.g., layer 3 and up and possibly some of layer 2 of the protocol stack) of the network node 36 may be implemented at the processing node(s) 54 as virtual components (i.e., implemented "in the cloud") whereas lower layer functionality (e.g., layer 1 and possibly some of layer 2 of the protocol stack) may be implemented in the radio unit(s) 46 and possibly the control system 38.

In some embodiments, a computer program including instructions which, when executed by the at least one processor 40, 58, causes the at least one processor 40, 58 to carry out the functionality of the network node 36 or a processing node 54 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 42, 60).

Figure 10:
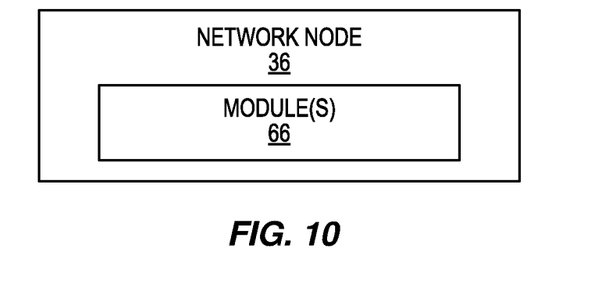

FIG. 10 is a schematic block diagram of the network node 36 according to some other embodiments of the present disclosure. The network node 36 includes one or more modules 66, each of which is implemented in software. The module(s) 66 provide the functionality of the network node 36 described herein (e.g., the functionality of a corresponding one of the network nodes described in relation to, e.g., FIGS. 4 and 5).

While not being limited thereto, some example embodiments of the present disclosure are provided below.

Embodiment 1: A method of operation of a wireless device (12, 12-1) in a wireless system (10), comprising: receiving (104), from a serving AP (14, 14-1), wireless device specific SRS or DMRS configuration information for one or more potential aggressor wireless devices (12, 12-2); performing (106) one or more measurements on at least one of the one or more potential aggressor wireless devices (12, 12-2) using the wireless device specific SRS or DMRS configuration information for the at least one of the one or more potential aggressor wireless devices (12, 12-2); and reporting (108) at least one of the one or more measurements to the serving AP (14, 14-1).

Embodiment 2: The method of embodiment 1 further comprising receiving (102), from the serving AP (14, 14-1), a request for periodic measurement reporting of SRS or DMRS transmitted by one or more aggressor wireless devices (12, 12-2) served by one or more other APs (14, 14-2).

Embodiment 3: The method of embodiment 1 further comprising receiving (102), from the serving AP (14, 14-1), one or more triggering conditions for aperiodic measurement reporting of SRS or DMRS transmitted by one or more aggressor wireless devices (12, 12-2) served by one or more other APs (14, 14-2).

Embodiment 4: The method of any one of embodiments 1 to 3 wherein the wireless device specific SRS or DMRS configuration information comprises wireless device specific time-frequency resource allocation and cell or wireless device specific SRS configuration information.

Embodiment 5: The method of any one of embodiments 1 to 3 wherein the wireless device specific SRS or DMRS configuration information comprises information that indicates OFDM symbols used for SRS transmission, RS sequences used, frequency hopping configuration, sub-band index, comb configuration or number, power setting, number of cyclic shifts, time periods (e.g., slots) where SRS transmissions should be measured, and/or a periodicity of the measurement opportunities.

Embodiment 6: A wireless device (12) for a wireless system (10), the wireless device (12) adapted to perform the method of any one of embodiments 1 to 5.

Embodiment 7: A wireless device (12) for a wireless system (10), comprising: one or more transceivers (26); and circuitry (20) associated with the one or more transceivers (26) whereby the wireless device (12) is operable to perform the method of any one of embodiments 1 to 5.

Embodiment 8: A wireless device (12) for a wireless system (10), comprising: one or more modules (34) operable to perform the method of any one of embodiments 1 to 5.

Embodiment 9: A method of operation of an AP (14, 14-1) in a wireless system (10), comprising: sending (104), to a victim wireless device (12, 12-1), wireless device specific SRS or DMRS configuration information for one or more potential aggressor wireless devices (12, 12-2); and receiving (108), from the victim wireless device (12, 12-1), a measurement report comprising at least one measurement of at least one of the one or more potential aggressor wireless devices (12, 12-2).

Embodiment 10: The method of embodiment 9 further comprising sending (102), to the victim wireless device (12, 12-1), a request for periodic measurement reporting of SRS or DMRS transmitted by one or more aggressor wireless devices (12, 12-2) served by one or more other APs (14, 14-2).

Embodiment 11: The method of embodiment 9 further comprising sending (102), to the victim wireless device (12, 12-1), one or more triggering conditions for aperiodic measurement reporting of SRS or DMRS transmitted by one or more aggressor wireless devices (12, 12-2) served by one or more other APs (14, 14-2).

Embodiment 12: The method of any one of embodiments 9 to 11 wherein the wireless device specific SRS or DMRS configuration information comprises wireless device specific time-frequency resource allocation and cell or wireless device specific SRS configuration information.

Embodiment 13: The method of any one of embodiments 9 to 11 wherein the wireless device specific SRS or DMRS configuration information comprises information that indicates OFDM symbols used for SRS transmission, RS sequences used, frequency hopping configuration, sub-band index, comb configuration or number, power setting, number of cyclic shifts, time periods (e.g., slots) where SRS transmissions should be measured, and/or a periodicity of the measurement opportunities.

Embodiment 14: The method of any one of embodiments 9 to 11 further comprising receiving (100), from one or more other APs (14, 14-2), the wireless device specific SRS or DMRS configuration information for the one or more potential aggressor wireless devices (12, 12-2).

Embodiment 15: An AP (14, 14-1) for a wireless system (10), the AP (14, 14-1) adapted to perform the method of any one of embodiments 9 to 14.

Embodiment 16: An AP (14, 14-1) for a wireless system (10), comprising: at least one processor (40, 58); and memory (42, 60) comprising instructions executable by the at least one processor (40, 58) whereby the AP (14, 14-1) is operable to perform the method of any one of embodiments 9 to 14.

Embodiment 17: An AP (14, 14-1) for a wireless system (10), comprising: one or more modules (66) operable to perform the method of any one of embodiments 9 to 14.

Embodiment 18: A method of operation of an AP (14, 14-1) in a wireless system (10), comprising: signaling (110), to one or more other APs (14, 14-2), to indicate wireless device specific transmission parameters which correspond to identified aggressor wireless devices (12, 12-2) based on SRS or DMRS measurement reports received from a victim wireless device (12, 12-2).

The following acronyms are used throughout this disclosure.

3GPP Third Generation Partnership Project
5G Fifth Generation
AP Access Point
ASIC Application Specific Integrated Circuit
CPU Central Processing Unit
DCI Downlink Control Information
DMRS Demodulation Reference Signal
DSP Digital Signal Processor
eNB Enhanced or Evolved Node B
FDD Frequency Division Duplexing
FDM Frequency Domain Multiplexing
FPGA Field Programmable Gate Array
gNB New Radio Base Station
LTE Long Term Evolution
MME Mobility Management Entity
ms Millisecond
MTC Machine Type Communication
NR New Radio
OFDM Orthogonal Frequency Division Multiplexing
P-GW Packet Data Network Gateway
PUSCH Physical Uplink Shared Channel
RAN Radio Access Network
RRC Radio Resource Control
RS Reference Signal
RSRP Reference Signal Received Power
RSRQ Reference Signal Received Quality
SCEF Service Capability Exposure Function
SINR Signal to Interference plus Noise Ratio
SRS Sounding Reference Signal
TDD Time Division Duplexing
UE User Equipment Those skilled in the art will recognize improvements and modifications to the embodiments of the present disclosure. All such improvements and modifications are considered within the scope of the concepts disclosed herein.

What is claimed is:

1. A method of operation of a wireless device in a wireless system, comprising:
   receiving, from a serving Access Point, AP, wireless device specific Sounding Reference Signal, SRS, or Demodulation Reference Signal, DMRS, configuration information for one or more potential aggressor wireless devices served by one or more other APs than the serving cell of the wireless device;
   performing one or more measurements on at least one of the one or more potential aggressor wireless devices using the wireless device specific SRS or DMRS configuration information for the at least one of the one or more potential aggressor wireless devices;
   reporting at least one of the one or more measurements to the serving AP; and
   either:
   receiving, from the serving AP, a request for periodic measurement reporting of SRS or DMRS transmitted by the one or more aggressor wireless devices, wherein the request for periodic measurement reporting of SRS or DMRS is received via a combination of physical layer signaling and higher layer signaling, wherein the physical layer signaling is downlink control information, DCI, signaling, and wherein the higher layer signaling provides a set of triggering conditions from which DCI signaling can dynamically trigger a measurement report; or receiving, from the serving AP, one or more triggering conditions for aperiodic measurement reporting of SRS or DMRS transmitted by the one or more aggressor wireless devices.

2. A wireless device for a wireless system, the wireless device adapted to:

receive, from a serving Access Point, AP, wireless device specific Sounding Reference Signal, SRS, or Demodulation Reference Signal, DMRS, configuration information for one or more potential aggressor wireless devices served by one or more other APs than the serving AP of the wireless device;

perform one or more measurements on at least one of the one or more potential aggressor wireless devices using the wireless device specific SRS or DMRS configuration information for the at least one of the one or more potential aggressor wireless devices;

report at least one of the one or more measurements to the serving AP; and either:

receive, from the serving AP, a request for periodic measurement reporting of SRS or DMRS transmitted by the one or more aggressor wireless devices, wherein the request for periodic measurement reporting of SRS or DMRS is received via a combination of physical layer signaling and higher layer signaling, wherein the physical layer signaling is downlink control information, DCI, signaling, and wherein the higher layer signaling provides a set of triggering conditions from which DCI signaling can dynamically trigger a measurement report; or receive, from the serving AP, one or more triggering conditions for aperiodic measurement reporting of SRS or DMRS transmitted by the one or more aggressor wireless devices.

3. A method of operation of an Access Point, AP, in a wireless system, comprising:

sending, to a wireless device, wireless device specific Sounding Reference Signal, SRS, or Demodulation Reference Signal, DMRS, configuration information for one or more potential aggressor wireless devices served by one or more other APs;

receiving, from the wireless device, a measurement report comprising at least one measurement of at least one of the one or more potential aggressor wireless devices; and either:

sending, to the wireless device, a request for periodic measurement reporting of SRS or DMRS transmitted by the one or more aggressor wireless devices, wherein the request for periodic measurement reporting of SRS or DMRS is sent via a combination of physical layer signaling and higher layer signaling, wherein the physical layer signaling is downlink control information, DCI, signaling, and wherein the higher layer signaling provides a set of parameter choices from which DCI signaling dynamically indicates a particular configuration; or sending, to the wireless device, one or more triggering conditions for aperiodic measurement reporting of SRS or DMRS transmitted by the one or more aggressor wireless devices.

4. An Access Point, AP, for a wireless system, the AP adapted to:

send, to a wireless device, wireless device specific Sounding Reference Signal, SRS, or Demodulation Reference Signal, DMRS, configuration information for one or more potential aggressor wireless devices served by one or more other APs;

receive, from the wireless device, a measurement report comprising at least one measurement of at least one of the one or more potential aggressor wireless devices; and either:

send, to the wireless device, a request for periodic measurement reporting of SRS or DMRS transmitted by the one or more aggressor wireless devices, wherein the request for periodic measurement reporting of SRS or DMRS is sent via a combination of physical layer signaling and higher layer signaling, wherein the physical layer signaling is downlink control information, DCI, signaling, and wherein the higher layer signaling provides a set of parameter choices from which DCI signaling dynamically indicates a particular configuration; or send, to the wireless device, one or more triggering conditions for aperiodic measurement reporting of SRS or DMRS transmitted by the one or more aggressor wireless devices.

5. The method of claim 1, further comprising:

receiving, from the serving AP, the one or more triggering conditions for the aperiodic measurement reporting of SRS or DMRS transmitted by the one or more aggressor wireless devices;

wherein the one or more triggering conditions comprise:

(a) a triggering condition that Reference Signal Received Power (RSRP) from the serving cell of the wireless device is below a certain threshold;

(b) a triggering condition that an aggregate cross-link interference exceeds a certain threshold;

(c) a triggering condition that a ratio of the aggregate cross-link interference and overall aggregate interference exceeds a threshold;

(d) a triggering condition that is based on an estimated value of a parameter that is associated with:
  (i) a burstiness of the RSRP from the serving cell;
  (ii) the aggregate cross-link interference;
  (iii) the ratio of the aggregate cross-link interference and the overall aggregate interference; or
  (iv) any two or more of (i)-(iii); or (e) any two or more of (a)-(d).

6. The method of claim 1, wherein the wireless device specific SRS or DMRS configuration information is received via a combination of physical layer signaling and higher layer signaling, wherein the physical layer signaling is DCI signaling, and wherein the higher layer signaling provides a set of parameter choices from which DCI signaling dynamically indicates a particular configuration.

7. The method of claim 1, wherein performing the one or more measurements on the at least one of the one or more potential aggressor wireless devices comprises blindly attempting to detect a DMRS from a set of DMRSs for the one or more potential aggressor wireless devices.

8. The method of claim 3, further comprising:
sending, to the wireless device, the one or more triggering conditions for the aperiodic measurement reporting of SRS or DMRS transmitted by the one or more aggressor wireless devices;
wherein the one or more triggering conditions comprise:
  (a) a triggering condition that RSRP from the serving cell of the wireless device is below a certain threshold;
  (b) a triggering condition that an aggregate cross-link interference exceeds a certain threshold;
  (c) a triggering condition that a ratio of the aggregate cross-link interference and overall aggregate interference exceeds a threshold;
  (d) a triggering condition that is based on an estimated value of a parameter that is associated with:
    (i) a burstiness of the RSRP from the serving cell;
    (ii) the aggregate cross-link interference;
    (iii) the ratio of the aggregate cross-link interference and the overall aggregate interference; or
    (iv) any two or more of (i)-(iii); or
  (e) any two or more of (a)-(d).

9. The method of claim 3, further comprising:
sending, to the wireless device, the request for the periodic measurement reporting of SRS or DMRS transmitted by the one or more aggressor wireless devices, wherein the request is wireless device specific;
wherein the sending of the request is triggered by:
  (a) an estimated value of a parameter related to received interference is below a threshold;
  (b) a number of downlink retransmissions in a certain period of time exceeds a threshold;
  (c) a number of consecutive retransmissions exceeds a threshold;
  (d) a buffer size of the wireless device for downlink exceeds a threshold;
  (e) an estimated value of a parameter that is related to burstiness of any of the above measures exceeds a threshold;
  (f) a number of wireless devices fulfilling any one or more of the above conditions exceeds a threshold; or
  (e) any two or more of (a)-(f).

* * * * *